United States Patent [19]

Harsch

[11] Patent Number: 5,315,805

[45] Date of Patent: May 31, 1994

[54] DEVICE FOR ERECTING WALLS OR CEILINGS, ESPECIALLY IN EXHIBITION CONSTRUCTIONS

[75] Inventor: Gerald Harsch, Bismarckstrasse, Fed. Rep. of Germany

[73] Assignee: Wilhelm Von Der Dellen, Pfeiferstrasse 83, Fed. Rep. of Germany

[21] Appl. No.: 25,520

[22] Filed: Mar. 3, 1993

[30] Foreign Application Priority Data

Sep. 28, 1991 [DE] Fed. Rep. of Germany ....... 4132447

[51] Int. Cl.⁵ .............................................. E04B 1/343
[52] U.S. Cl. ...................................... 52/775; 52/36.5; 52/721; 52/738; 403/170
[58] Field of Search ...................... 52/36.1, 36.4, 36.5, 52/36.6, 721, 738; 403/170, 171, 174, 217

[56] References Cited

U.S. PATENT DOCUMENTS

| 3,574,367 | 4/1971 | Jankowski ........................ 287/54 |
| 4,021,973 | 5/1977 | Hegg et al. ...................... 52/738 X |
| 4,455,103 | 6/1984 | Hackenberg ...................... 403/190 |
| 4,583,359 | 4/1986 | Staeger ............................. 52/721 |

FOREIGN PATENT DOCUMENTS

| 139954 | 5/1982 | European Pat. Off. ............ 403/170 |
| 2931026 | 6/1984 | Fed. Rep. of Germany . |
| 3703907 | 8/1988 | Fed. Rep. of Germany . |

*Primary Examiner*—Carl D. Friedman
*Assistant Examiner*—Kevin D. Wilkens
*Attorney, Agent, or Firm*—Shlesinger Arkwright & Garvey

[57] ABSTRACT

A device for erecting walls and/or ceilings includes a support shaped-section evincing approximately cross-sectionally T-shaped webs to which at least one beam for wall- and/or ceiling segments can be detachably affixed, further a clamping lock detachable fastened inside the hollow beam and comprising a central retaining element and two spring-steel, lateral retaining elements mounted symmetrically relative to central retaining element. The retaining elements engage adjacent and undercut channels formed by the webs and are tightened against two adjacent webs of the support shaped-section by a rotationally actuated, transverse tightening system crossing the three retaining elements through mutually flush clearances. At the same time, the tightening system affixes the clamping lock inside the beam. The two lateral, elastic retaining elements are joined in integral manner at their rear ends away from the support shaped-section and are mounted in a clamping-lock housing also receiving the central retaining element and the rotatable tightening system. The tightening system comprises a central, cylindrical part crossing the three retaining elements through mutually flush clearances and furthermore two external washers enclosing between them the two lateral retaining elements, the inside surfaces of washers each resting against the associated lateral retaining element. Each of the inside surfaces of the two external washers comprise an actuation plane corresponding to one of the associated lateral retaining elements.

12 Claims, 2 Drawing Sheets

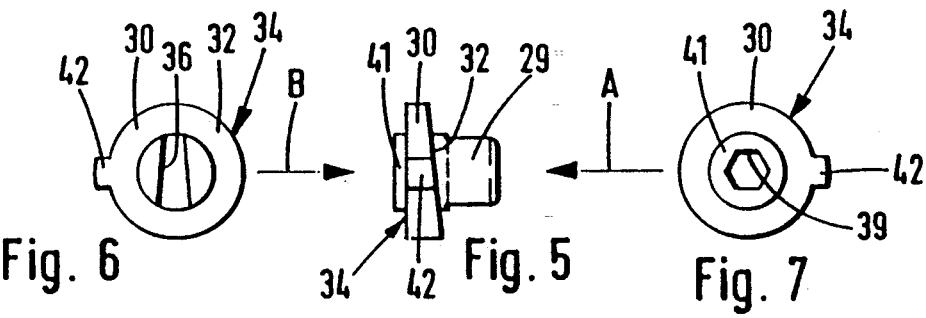
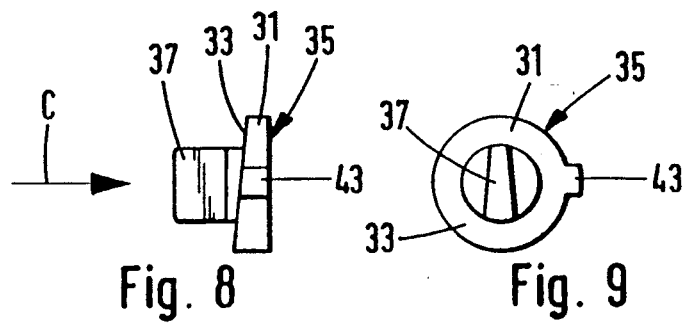
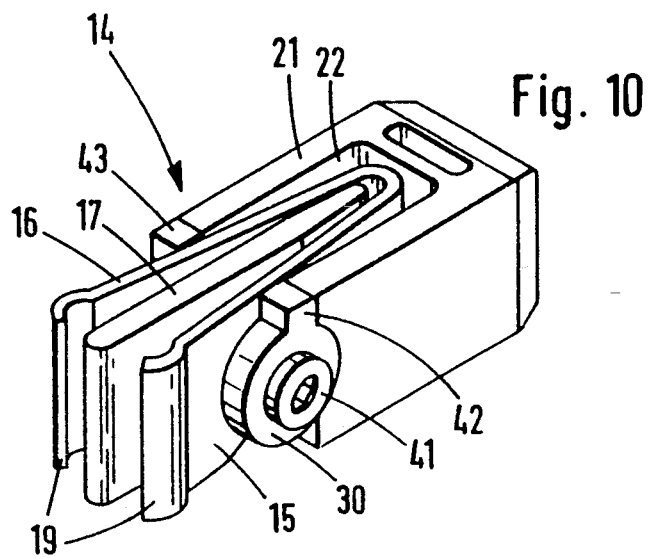

DEVICE FOR ERECTING WALLS OR CEILINGS, ESPECIALLY IN EXHIBITION CONSTRUCTIONS

FIELD OF THE INVENTION

The invention concerns a device for erecting walls and/or ceilings especially for exhibition purposes as at fairs and to be used as exhibition pavilions, free-standing structures, single- or multi-story lobby booths and the like.

BACKGROUND OF THE INVENTION

A device for erecting walls and/or ceilings especially for exhibition purposes as at fairs and to be used as exhibition pavilions, free-standing structures, single- or multi-story lobby booths and the like, comprises a support-shaped section, a beam for wall and/or ceiling segments being detachably affixed to approximately cross-sectionally T-shaped webs of the support shape-section and a clamp detachably affixed to the inside of the beam which is hollow. The clamp in the assembly position is associated with the undercut channels defined by the webs of the support shaped-section and tightened by a rotationally driven tightening system against two adjacent webs of the support shaped-section while the clamp is simultaneously affixed inside the beam by the tightening system.

In such devices, short, support shaped-sections as a rule are the central or the corner erection components and determine the angles subtended between the walls or ceilings.

The walls or ceilings are held by beams in the form of hollow shaped-sections engaging the support shaped-section by clamping locks. As a rule the various wall and/or ceiling erections, for instance fair booths, which are to be set up in simple manner, will be regular quadrangular, hexagonal or octagonal constructions.

The German Offenlegungsschrift 37 03 907 discloses a device of the initially cited kind and its object already is a further development of a similar device disclosed in the German patent 29 31 026.

The known clamping-lock design of German patent 29 31 026 does incur a drawback in that two to three revolutions of the tightening system, which is a screw, are required to actuate such a clamping lock. As a result assembly and disassembly times of the wall and ceiling constructions are significantly lengthened. In the case of inexpert (i.e., excessive) actuation of the clamping lock, there is the further danger that the walls of the beam, which as a rule is made of aluminum, shall be unduly stressed by expanded rear ends of the lateral retaining elements, and externally visible pressure spots arise at the support walls.

The German patent 29 31 026 incurs further drawbacks in that on account of the loose central retaining element, accurate positioning of the hollow shaped-section (beam) is substantially hampered, in that the two lateral retaining elements will close on one side so that there take place shifts of the clamping lock and the hollow shaped-section it holds, and in that it is impossible to accurately center the clamping lock inside the hollow shaped-section because this clamping lock is merely held in place by the screw head of the tightening system. Because the two lateral retaining elements of the known clamping lock do not rest automatically, disassembly of the hollow shaped-section from the support shaped-section is made more difficult.

While some of the above shortcomings could be averted by the known clamping lock of the German Offenlegungsschrift 37 03 907, on the other hand the cost involved to do so was prohibitive because of a special design of the clamping lock. Illustratively this known tightening system designed as a cam comprises a metal core clad in an injection-molded plastic. An actuation groove is present in the plastic coating and externally covers each lateral retaining element. The metal core of the known tightening system consists of two integral cylindrical elements however eccentrically offset from each other, one of which constitutes the actuation head in the form of a hexagonal socket and projects from the plastic cladding, the other forming an inner support for the plastic cladding used to hold the tightening system inside the central retaining element and to actuate the lateral retaining elements. Furthermore, the second cylindrical element comprises integral, bilaterally supporting collars extending on both sides of the actuation groove.

The drawback in the German Offenlegungsschrift 37 03 907 that hampers practical application is that on one hand the plastic cladding of the tightening system cannot indefinitely withstand the high forces generated when handling said device and therefore the clamping lock will be unfit for service after short operation because of the wear of the tightening system. The tightening system cannot be made entirely of metal because it is too complex in shape. Again the metal core of the known plastic-clad tightening system can be manufactured only at high cost because of its complex shape.

It should be noted that the term "shaped-section" is used for convenience, and includes all sorts of cross-sections, such as U-sections, T-bars, and the like.

OBJECTS AND SUMMARY OF THE INVENTION

The object of the invention is to create a device of the initially cited kind comprising a clamping lock operating accurately, reliably and durably, while at the same allowing economic manufacture.

The invention solves this problem for a device of said species and will be described below.

The device of the invention is made of metal for strength and can be easily and economically manufactured or worked. The tightening system can be made without cutting and without subsequent finishing, preferably in that it or its components are made of sintered metals and/or by die casting. However it may also be made of steel. In the latter case it may be manufactured by cutting (turning, milling etc.).

Because of its slanted inner surfaces, the tightening system of the invention allows simple, reliable closing and opening of the clamping lock, merely half a revolution (180° rotation) of the tightening system being required. (Depending on shape and tolerances of the components to be joined by the clamping lock, a clamping angle much less than 180° may be adequate in many cases).

The tightening system is without costly eccentric design features. The manufacture of the clamping lock of the invention is economical because of the integral nature of the two lateral retaining elements. The design of the invention furthermore offers the essential advantage that in simple manner it makes possible automatic and elastic return of the lateral retaining elements from their closed position as soon as the tightening system is loosened.

Other features of the invention concern an economical and simple design of the clamping lock of the invention. Because the lock housing and the central retaining element are integral, and because furthermore the lateral retaining elements close uniformly on both sides, advantageously accurate and problem-free positioning and centering of the clamping lock and hence of the pertinent hollow shaped-section (beam) is assured at the associated support shaped-section.

Further advantageous embodiments of the invention are related to economical manufacture.

A further advantageous embodiment of the invention ensues reliable limitation to the maximally possible and permitted angle of rotation (180°) when actuating the tightening system. Excess rotation of this device is precluded thereby.

The other features of the invention relate to a special design of the tightening system and achieve the advantage, in addition to easy assembly of the said device. This device will press on both sides against the inside wall of the hollow shaped-sections and in the direction of the outside when the clamping lock is being closed (tightening of the two lateral retaining elements) on account of the reaction (spring force) of said retaining elements, as a result of which the entire clamping lock is affixed by friction inside the hollow shaped-section.

The tightening system of the invention can be made in simple manner of metal and with adequate strength with great dimensional stability and without expensive finishing.

The preferred embodiment of the lateral retaining elements defined makes possible accurate and reliable actuation by means of the washer slants of the tightening system.

The inventory is illustrated and elucidated below by a didactic embodiment mode shown in the drawing.

BRIEF DESCRIPTION OF THE DRAWINGS

FIG. 5 is a side view of one component of the two-component tightening system of the clamping lock of FIGS. 1 and 2, (actual size), FIG. 6 is the object of FIG. 5 seen in the direction of arrow A (FIG. 5), FIG. 7 is the object of FIG. 5 seen in the direction of arrow B (FIG. 5), FIG. 8 is a side view of the other component of the two-component tightening system of the clamping lock of FIGS. 1 and 2 (actual size), FIG. 9 is the object of FIG. 8 seen in the direction of arrow C (FIG. 8) and FIG. 10 is a separate perspective of the clamping lock of FIGS. 1 and 2.

DETAILED DESCRIPTION OF THE DRAWINGS

Figure 1:
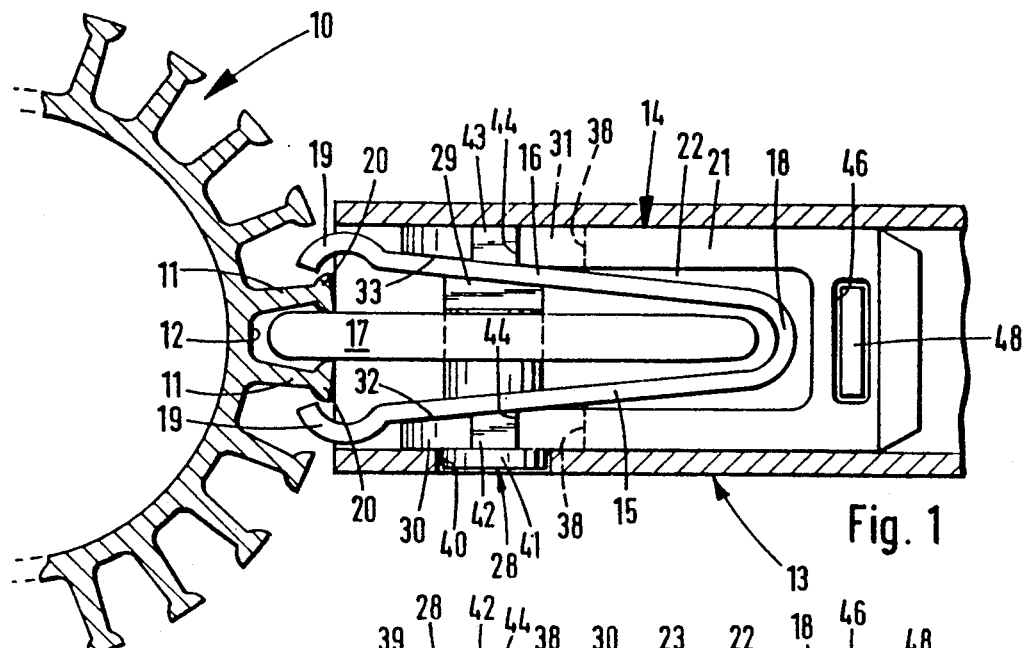
FIG. 1 is a top view (partly shown as a cutaway) and on an enlarged scale of an illustrative embodiment of the device of the invention, the clamping lock being engaged.

FIG. 1 shows a support shaped-section 10 made as a hollow, drawn or extruded section and comprising on its periphery a number of projections in the form of cross-sectionally shaped T webs 11, where said number is divisible by 3 or 4 and preferably is 24, the webs being apart by channels 12 between them. A beam 13 is affixed radially to the support shaped-section 10 and in turn holds in suitable manner wall or ceiling segments (omitted).

A separate clamping lock denoted overall by 14 serves to affix the beam 13 to the support shaped-section 10. It comprises three retaining elements 15, 16 and 17 each radially engaging three adjacent channels 12 between four adjacent webs 11 of the support shaped-section 10. The spacings between the webs 11 and the dimensions of the retaining elements 15, 16 and 17 are so mutually matched at their ends facing the support shaped-section 10 that, when in their unstressed state, the retaining elements 15, 16 and 17 can be radially inserted from the outside into the channels 12 between the webs 11 of the support shaped-section.

Figure 4:
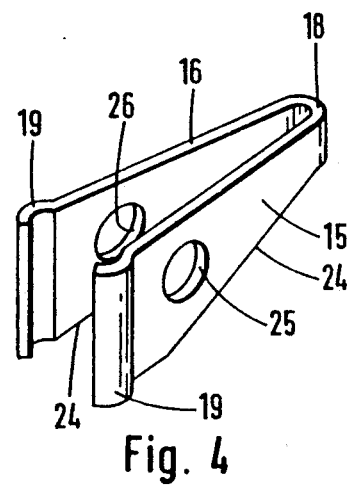
FIG. 4 shows the two lateral retaining elements of the clamping lock of FIGS. 1 and 2 in separate perspective (actual size)

As further shown by FIGS. 1 and 4, the two lateral retaining elements 15, 16, which are made of steel, are joined together at their rear ends (at 18) so as to form an approximately V-shaped integral part. At their front ends facing the support shaped-section, the lateral retaining elements 15, 16 each evince a jaw-like bend 19 that, in the tightened condition of the clamping lock 14, reach behind the thickened ends 20 of the webs 11 of the support shaped-section 10.

FIG. 1 (and further FIG. 10) also shows that the two lateral retaining elements 15, 16 are mounted symmetrically relative to the already cited central retaining element 17. The central retaining element 17 enters by its front end near the support shaped-section the space between two adjacent webs 11 of the support shaped-section 10. FIG. 1 makes it plain that the width of the central retaining element 17 precisely matches the spacing between the two adjacent webs 11 of the support shaped-section 10, as a result of which said webs, once externally loaded by the jaws 19 of the lateral retaining elements 15, 16, are then able to rest against the central retaining element 17.

Figure 2:
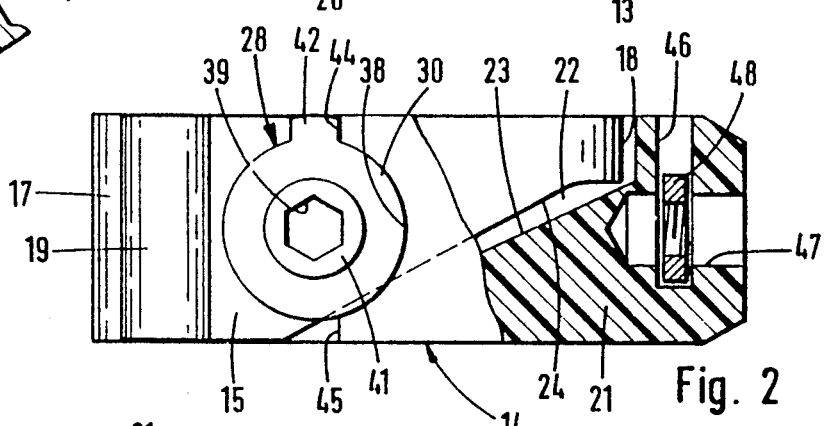
FIG. 2 is a side view of the clamping lock of FIG. 1 (beam and support shaped-section are omitted)
Figure 3:
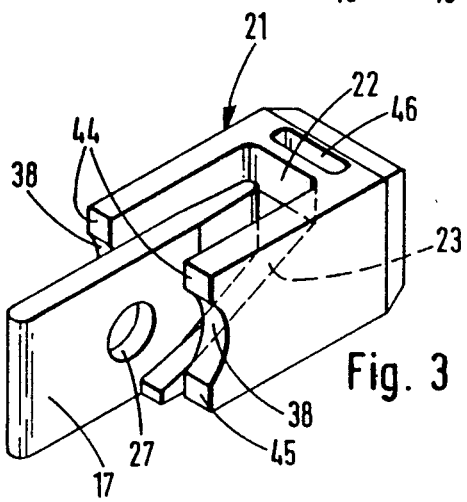
FIG. 3 is the housing of the clamping lock of FIGS. 1 and 2 shown in separate perspective (actual size)

As further shown by the drawing and in particular by FIGS. 1, 2 and 10, the three retaining elements 15, 16 and 17 are mounted in a clamping-lock housing denoted overall by 21 (also see its separate perspective of FIG. 3). The clamping-lock housing 21 is made of plastic and preferably is injection molded for simple and economical manufacture.

One feature of the invention consists in the central retaining element 17 being integral with the clamping-lock housing 21. The two lateral retaining elements 15, 16, which also are one integral part, are mounted in a special and approximately U-shaped clearance 22 in the clamping-lock housing 21. For that purpose the U-shaped clearance 22 comprises a surface 23 sloping downward from the rear to the front, i.e., in the direction of the support shaped-section 10 of FIG. 1, and the lateral retaining elements 15, 16 also are sloping correspondingly (FIGS. 2 and 4), the slant surfaces of the lateral retaining elements 15, 16 being denoted by 24. As a result the material of the lateral retaining elements 15, 16 occupies the least space at its junction 18.

As shown by the drawing and in particular by FIGS. 3 and 4, boreholes 25, 26 and 27 are present in the three retaining elements 15, 16 and 17 resp. an will be flush in the assembly position of the clamping lock 14. They serve to receive a tightening system denoted overall by 28 (FIGS. 1, 2 and 10). FIGS. 5 through 9 show this tightening system separately. Accordingly the tightening system 28 comprises a central cylindrical part 29 passing through the boreholes 25, 26, 27 of the retaining elements 15, 16, 17 and further two washers or disks 30 and 31 at the ends of said part 29. In the assembly position (FIGS. 1, 2 and 10), the two washers 30, 31 of the tightening system 28 enclose the two lateral retaining elements 15, 16 (also the central retaining element 17) between them. Each washer 30 and 31 comprises a slanted inner surface 32 and 33 by which it rests against the particular lateral retaining element 15 and 16 resp. (in particular see FIG. 1). The slant of the inner surfaces 32, 33 of the washers 30, 31 therefore approximately corresponds to the plane formed by the associated lateral retaining element 15 or 16.

As shown especially clearly by FIGS. 5-9, a further feature of the tightening system 28 is that it consists of two tightening-device components or wedge-like disks or washers 34 (FIG. 5 through 7) and 35 (FIGS. 8 and 9). The tightening device components 34, 35 are resp. associated with the washers 30, 31. As shown by FIGS. 5-7, the tightening-device component 34 consists of the washer 30 and the central cylindrical part 29 rigidly affixed to said washer, said part 29 comprising an axial slot 36 of which the walls subtend an angle with each other (see especially FIG. 6). As regards the other tightening-device component 35 (FIGS. 8 and 9), a flat-topped cog 37 is integral with the washer 31 and matches the contours of the axial slot 36 of the cylindrical part 29 (in particular see FIGS. 6 and 9).

OPERATION

For the assembly position of the clamping lock 14 (FIGS. 1, 2 and 10), the cog 37 of the tightening-device component 35 (FIGS. 8 and 9) engages the axial slot 36 of the tightening-device component 34 (FIGS. 5-7) and thereby represents a relatively irrotational but axially displaceable connection between the two components 34 and 35 forming the tightening system 28. The mutually oblique boundary walls of the slot 36 on one hand and on the other hand the converging walls of the cog 37 ensure proper operational alignment of the two tightening-device components 34 and 35 and hence assembly errors shall be avoided.

Another feature of the invention is that the clamping-lock housing 21 only extends as far as the washers 30, 31 with the circular outer contours (in particular see FIGS. 2, 3 and 10). Accordingly the adjoining boundaries 38 of the clamping-lock housing 21 are arcuate in matching manner.

In order to set the clamping lock 14 into the closed position at the support shaped-section 10 (FIG. 1), the tightening system 28 must be rotated. For that purpose said device 18 comprises a hexagonal socket 39 which will be driven by a hexagonal wrench. To change the clamping lock 14 from the open position (FIG. 1) into the closed position, a tightening angle of at most 180° suffices in the light of the (inner) slants 32, 33 of the tightening system 28, so that the maximum rotation is only half a revolution. In this process the two lateral retaining elements 15, 16 are compressed against their spring force, their jaw-like ends 19 firmly gripping from behind the bulges 20 at the webs 11 of the support shaped-section.

Loosening the tightening system 28 (moving the clamping lock 14 into the open position) takes place correspondingly, that is by rotating the tightening system 28 by a maximum of 180°, though this time in the opposite direction from that for the closing process. Because of the elastic design of the lateral retaining elements 15, 16, these will automatically spread apart and then the clamping lock (together with the beam 13 linked to it) can be detached from the support shaped-section 10 and be moved away.

Rotation overshoot of the tightening system 28 is advantageously averted by an integral and radially directed projection 42 and 43 on the circumference of each washer 30 and 31 resp, said projection coming to rest against the adjacent surfaces 44 and 45 of the lock housing 21 at the end of a particular actuation.

The following remarks apply to affixing the clamping lock 14 to the beam 13 which is in the form of a hollow shaped-section: As shown by FIG. 1, the beam 13 comprises a lateral borehole 40 entered by the tightening system 28 with a boss 41 (also see FIGS. 2, 5 and 7) machined on the washer 30. Accordingly the clamping lock 14 is affixed in geometrically linking manner inside the beam 13. When the clamping lock 14 is moved into the closed position or already is in it (see the above relevant discussions), the elastic reaction from the compressed lateral retaining elements 15, 16 on one hand and on the other hand the axial displaceability of the tightening-device components 34, 35 will provide lateral bracing of the washers 30, 31 by the inner walls of the beam 13, whereby in addition and in advantageous manner an additional frictional connection is set up between the clamping lock 14 and the beam 13.

At the same time and in advantageous manner the rest provided by the beam 13 to the washers 30, 31 provides load relief to said washers 30, 31 as regards their bending when the two lateral retaining elements 15, 16 are being tightened.

A further feature of the illustrative embodiment shown in the drawing (in particular FIGS. 1, 2 and 3) is the presence of a vertical slot 46 located in the rear zone of the clamping-lock housing 21 and which is intersected at right angles by a borehole 47. A preferably square nut 48 is mounted in the slot 46. In particular as shown by FIG. 2, the slot 46 and the borehole 47 are so mutually arranged that the square nut 48 placed in the slot 46 can be reached by a screw (omitted) inserted into the borehole 47. The above steps serve the purpose of affixing additional parts of arbitrary nature to the rear zone of the clamping lock 14.

On the other hand and alternatively, and preferably where the length of the clamping lock 21 is desired to be or must be shortened, the slot 46 may be omitted and instead merely an axial hole (corresponding to the "borehole 47") shall be injection-molded into the clamping-lock housing 21. This axial hole then may be used if needed as the core hole for a thread (to be tapped).

What is claimed is:

1. A device for erecting walls and/or ceilings especially for exhibition purposes as at fairs and to be used as exhibition pavilions, free-standing structures, single- or multistory lobby booths and the like, comprising:
   a) a support shaped-section for securing to a hollow beam for a wall and/or ceiling segment, wherein said hollow beam is detachably affixed to approximately cross-sectionally T-shaped webs of said support shaped-section;
   b) clamping lock detachably affixed to the inside of the beam;
   c) said clamping lock comprising a central retaining element and two spring-steel lateral retaining elements arranged symmetrically relative to said central retaining element;
d) said central and lateral retaining elements in an assembly position of said device entering undercut channels defined by the webs of the support shaped-section;
e) rotationally driven tightening system passing through mutually flush boreholes in said central and lateral elements for tightening said central and lateral elements against two adjacent webs of the support shaped-section, said clamping lock being simultaneously affixed inside the beam by said tightening system;
f) said lateral retaining elements being integrally joined at their rear ends away from the support shaped-section;
g) a clamping-lock housing receiving said central and lateral retaining elements and said rotatable tightening system;
h) said tightening system comprising a central cylindrical part crossing said lateral and central retaining elements through said mutually flush boreholes and further comprising two external washers located at the ends of said central cylindrical part and enclosing between them said lateral retaining elements; and
i) said external washers having inner surfaces each comprising an actuation slanting surface corresponding to the plane subtended by the associated retaining element.

2. Device defined in claim 1, wherein:
a) said clamping-lock housing is integral with said central retaining element and comprises an approximately U-shaped clearance receiving said lateral retaining elements.

3. Device defined in claim 2, wherein:
a) said U-shaped clearance disposed in said clamping-lock housing evinces a rest surface sloping downwardly from the rear to the front toward the support shaped-section for supporting said lateral retaining elements; and
b) said lateral retaining elements are slanting in corresponding manner to said rest surface in such a way that their rear junction is the narrowest and that they continuously widen toward their free ends in the direction of the support shaped-section.

4. Device defined in claim 2, wherein:
a) said clamping-lock housing and said central retaining element are made of plastic.

5. Device defined in claim 2, wherein:
a) said clamping housing and said central retaining element are made of plastic made from injection molding.

6. Device defined in claim 1, wherein:
a) said two external washers of said tightening system are circular; and
b) said clamping-lock housing extends on each side as far as said washers and rests against them in respective circular segments.

7. Device defined in claim 6, wherein:
a) said tightening system comprises two axially mutually displaceable and detachable tightening-system components which in the assembled position are linked together to be mutually irrotational with respect to each other; and
b) each of said washers is associated with respective tightening-system components.

8. Device defined in claim 7, wherein:
a) one of said washers includes said central cylindrical part rigidly fastened thereto; and
b) said central cylindrical part comprises an axial slot which cooperates with a geometrically locking and approximately lamellar drive.

9. Device defined in claim 8, wherein:
a) one of said tightening-system components having said central cylindrical part is die cast and the other tightening-system component is sintered metal.

10. Device defined in claim 6, wherein:
a) at least one of said washes of said tightening system includes radially directed projection as a stop and cooperates with front edges of said clamping-lock housing on the side of the support shaped-section acting as a stop-matching surface.

11. Device defined in claim 6, wherein:
a) each of said washers of said tightening system includes a radially directed projection as a stop and cooperates with respective front edges of said clamping-lock housing on the side of the support shaped-section acting as stop-matching surfaces.

12. Device defined in claim 1, wherein:
a) said lateral retaining elements starting from their rear ends diverge toward their free ends in a V-shape.

* * * * *